United States Patent [19]

Rawlins

[11] 4,428,994

[45] Jan. 31, 1984

[54] ANTI-GRAFFITI FACING OF WALLS OR SIMILAR SURFACES

[75] Inventor: Patrick R. Rawlins, Oxford, England

[73] Assignee: Hubdean Limited, Oxford, England

[21] Appl. No.: 283,605

[22] Filed: Jul. 15, 1981

[30] Foreign Application Priority Data

Jul. 19, 1980 [GB] United Kingdom ................ 8023700

[51] Int. Cl.[3] ........................... B32B 3/00; B05D 5/00

[52] U.S. Cl. .................................... 428/164; 427/260; 427/270; 428/165; 428/703

[58] Field of Search ............... 427/260, 262, 264, 270, 427/265, 266; 428/142, 164, 165, 703; 52/309.17, 515, 517

[56] References Cited

U.S. PATENT DOCUMENTS 3,819,395 6/1974 Yocum ............................... 427/264

3,853,577 12/1974 Nishida et al. ...................... 427/270

*Primary Examiner*—Evan K. Lawrence

*Attorney, Agent, or Firm*—Watson, Cole, Grindle & Watson

[57] ABSTRACT

A facing for a wall or similar surface, primarily for anti-graffiti purposes, is provided by firstly the application to the surface to be faced of a layer of a primer and sealing coating composition containing a proportion of aggregate material such as china clay and a resin bonding agent. This first layer seals the surface and provides an adhesive exposed surface for receiving a further coating composition, e.g., in paste form. The further coating composition comprises an aqueous mixture of setting and filler materials such as gypsum and china clay, respectively, a resin binder, a hardening and strengthening constituent such as mica and a water-soluble coloring dye. On setting, the further coating composition provides a hard indentation-resistant surface, but prior to setting, the exposed surface thereof is textured to provide a relief preferably a patterned relief. A finish coating of cellulose-based paint is then applied to this textured surface to provide a textured final surface of the facing which can be over-sprayed by the same kind of paint to obliterate graffiti on the textured final surface caused by the application thereto of aerosol spray paint. The color of the water-soluble coloring dye used in the further coating composition is chosen so that the further coating composition is substantially the same color as the color of the finish coating of cellulose-based paint.

21 Claims, No Drawings

ANTI-GRAFFITI FACING OF WALLS OR SIMILAR SURFACES

BACKGROUND OF THE INVENTION

The present invention relates to a method of facing or treating walls or similar surfaces whereby defacement thereof, e.g., by the application of graffiti or similar marking, can be minimized or readily overcome. Alternatively, or additionally, a decorative and durable wall or similar facing or cladding can be provided.

The invention has particular practical application to the facing of walls or wall panels of subways and other usually public places. The practical advantages of the invention in overcoming the problem of defacement as well as in other respects will be apparent from the following disclosure.

SUMMARY OF THE INVENTION

According to this invention a facing for a wall or similar surface, primarily for anti-graffiti purposes, is formed by a method which comprises:

(a) applying a first layer of a priming and sealing coating composition to the surface to be faced in order to seal the surface to be faced and to provide an adhesive exposed surface to which another layer of material will readily adhere;

(b) applying to the exposed surface of this first layer a second layer of a further coating composition comprising an aqueous mixture of a plaster material, filler materials and binding and hardening constituents, and a water-soluble colouring dye, this coating composition, on setting, providing a hard exposed surface which is resistant to indentation;

(c) texturing the exposed surface of the second layer prior to hardening to provide a relief, preferably a patterned relief, in the exposed surface, and (d) applying to the textured, exposed surface of the hardened second layer a finishing layer of a finish composition containing cellulose-based colouring matter, the cellulose-based colouring matter in the finish composition having a colour which is substantially the same as the colour of the water-soluble colouring dye in the further coating composition used to form the second layer of the facing so that the colour of the finish layer is substantially the same as the colour of the further coating composition. The finishing layer is applied such that the final exposed surface of the formed facing will be textured.

DESCRIPTION OF A PRACTICAL EMBODIMENT

In practice the procedure of facing a wall or wall panel or cladding for anti-graffiti purposes and also for decorative purposes is as follows: Depending on the nature of the wall or panel surface or similar substrate, a layer of an appropriate primer sealing coating composition is applied to the required surface or surfaces thereof in any suitable manner such as by brush, roller or spray application. Thus, in the case of flat or curved panels of chipboard, hard-board, asbestos, wood or metal, the primer coating composition may consist of an oleo-resinous binder and an alkali-resisting mica-based pigment, together with suitable solvents. The coating composition contains a proportion of aggregate material such as china clay, preferably not exceeding 10% by weight. Other resin-based binding and sealing agents may be employed such as polyvinyl acetate or butadiene styrene. The coating composition seals the surface (e.g. against dampness) and provides specific and mechanical bonding adhesive characteristics for the subsequent application of a layer of a further coating composition, i.e., after oxidation or drying of the primer coating composition has taken place to an adhesive condition.

The layer of the further coating composition may be applied as a water mixed paste to the primed surface in any suitable manner such as by brush, roller, spray or trowel application or by mechanical means, or it may be of a consistency such that is can be poured on to the surface to a required thickness, e.g., by skimming off to the desired depth. In the case of a paste, the coating composition is mixed to the appropriate consistency of a semi-viscous cake mix.

A typical composition comprises a plaster setting base in the form of hydrated calcium sulphate (gypsum), and a binder such as gum arabic, polyvinyl acetate or butadiene-styrene. Mica such as exfoliated mica is included as a filler which acts as a hardening and strengthening agent. The composition includes an additional filler consisting of clay, whiting or alumina.

An example of the proportions of the solid constituents of the further coating composition (excluding subsequently added water-soluble dye) are as follows:

Semi hydrated plaster: 34%
China clay/whiting: 34%
Asbestos: 4%
Resin binder: 5%
Colouring pigment powder: 3%
Exfoliated mica: 10%
Mica: 10%

Asbestos is included in the above example to provide a fibrous binder.

The desired viscosity of the further coating composition and depth of application will vary depending upon the degree of texturing and/or patterning which is subsequently effected on the surface of the further coating. Prior to application the further coating composition is preferably dyed with an appropriate water-soluble colouring material which has a colour which is substantially the same as the colour of the cellulose-based colouring matter used in the finish composition which provides the exposed surface of the formed facing.

After application of the layer of further coating composition and any partial drying thereof as necessary, the exposed surface thereof is then subjected to texturing such as by means of a hair or rubber stippler to produce a relief surface especially in sharp relief. Preferably a design or pattern is applied by the texturing operation. Various tools or mechanical means may be used for effecting the texturing in relief with appropriate artistic expertise as regards form and pattern.

As drying or evaporation continues, setting and hardening of the further coating composition takes place and which, dependent on temperature and humidity, is normally completed within a period of about four to twelve hours. The hard, textured, preferably patterned, exposed surface of the further coating composition is then sprayed with a primer or base finish coat consisting of a cellulose-based paint. Other suitable coating material serving as a base finish coat may be employed such as acrylic primer.

After such primer finish coating has dried, a final finish coating of cellulose based paint is then applied, e.g., by spray or brush application, in a selected metallic or plain colour which is substantially the same as the colour of the further coating composition. As well as providing the finished appearance of the facing, the final finish coating also effects further hardening of the textured and patterned surface of the second layer, and by appropriate application can make the facing weather resistant for outside use. Such cellulose-based paint for the final finish coating may be alkyd modified. It should be noted that the finish coating, whether it consists of one or more layers of paint, is applied such that the final exposed surface of the formed facing will be textured.

The hard, textured or patterned, surface of the finished facing is such that it cannot readily be written on or otherwise marked with a writing instrument such as a felt-tipped pen, whilst its hardness is resistant to indentation such as scratching or cutting and which, even if effected, is hardly apparent because the dyed colour of the further coating composition is substantially the same as that of the finished paint coating.

Whereas the finished facing can be effectively defaced by the use of aerosol paint sprayers, the problem can be readily overcome by obliterating the marking rather than attempting to remove it by conventional means. Especially as one of the main constituents of paint used in practically all aerosol paint sprayers is nitro-cellulose, such obliteration can be effectively carried out by aerosol spraying over the marking with a nitro-cellulose based-paint of a colour that matches the metallic or plain finish coating of the facing. This can be readily effected with little or no skill by a few spraying passes of the aerosol over the marking, and owing to the fact that similar nitrocellulose spray paint is used, the applied graffiti or similar marking is dissolved by the solvent of the super-imposed spray paint application due to its reversible nature and thus mixes with the latter at the same time filling up or rendering inconspicuous any cuts or scratches.

As will be appreciated from the foregoing, not only is the application of graffiti by marking with pen or similar application made difficult or virtually impossible and thus discouraged, but also paint spray marking can be readily and quickly overcome by obliteration in the manner described above so as to restore the facing to its original condition.

The textured or patterned surface of the facing reflects light in numerous directions and thus facilitates the concealment of any patches when obliteration or touching up is necessary. A further property of the finished facing is that cuts or scratches tend to have a self closing or "healing" action after restorative spray application of appropriate cellulose-based paint.

Whereas the facing can be applied to an existing wall or similar surface, its use can be facilitated by application in a matching manner to panels or cladding which can be subsequently erected or fitted on site. Thus a continuous mural design can be provided in an attractive and aesthetically appealing manner.

It is to be understood that the present invention includes within its scope not only the method of facing wall or similar surfaces as herein defined and described, but surfaces when so treated including faced panels or cladding as well as the combination of materials when supplied ready for carrying out the method of facing.

I claim:

1. A method of treating a surface so as to provide a facing thereon which has a coloured and textured exposed surface to which graffiti cannot be easily applied and, if successfully applied, from which it can be easily obliterated, said method comprising (a) applying to the surface to be faced a first layer of a priming and sealing coating composition which contains an aggregate material and a bonding agent, said first layer adhering to the surface to be faced and providing an exposed adhesive surface to which a second layer of coating material will readily adhere, (b) applying to the exposed surface of said first layer a second layer of a further coating composition which contains an aqueous mixture of a plaster material, a binding agent, a filler for hardening the further coating composition and a water-soluble colouring dye, said second layer providing an exposed surface which, prior to hardening, can be textured, (c) texturing the exposed surface of said second layer so as to provide a relief thereon, (d) allowing said second layer to harden such that the textured, exposed surface thereon will become resistant to indentation and cutting, and (e) applying over the textured, exposed surface of said hardened second layer a finishing layer of a cellulose-based coating, said finishing layer containing colouring matter and having a colour which is substantially the same as the colour of said further coating composition.

2. The method as defined in claim 1 wherein said priming and sealing coating composition contains up to 10% by weight of said aggregate material.

3. The method as defined in claim 1 wherein said aggregate material consists of china clay.

4. The method as defined in claim 1 wherein the bonding agent in said priming and sealing coating composition is selected from the group consisting of polyvinyl acetate and butadiene styrene.

5. The method as defined in claim 1 wherein said priming and sealing coating composition also contains mica.

6. The method as defined in claim 1 wherein the plaster material in said further coating composition consists of at least partially dehydrated calcium sulphate.

7. The method as defined in claim 1 wherein said further coating composition includes an additional filler.

8. The method as defined in claim 7 wherein said additional filler is selected from the group consisting of china clay, whiting and alumina.

9. The method as defined in claim 1 wherein said filler for hardening said further coating composition consists of mica.

10. The method as defined in claim 1 wherein the binding agent in said further coating composition is selected from the group consisting of gum arabic, polyvinyl acetate and butadiene-styrene.

11. The method as defined in claim 1 wherein said first layer is applied to said surface to be faced by being brushed thereon.

12. The method as defined in claim 1 wherein said first layer is applied to said surface to be faced by being rolled thereon.

13. The method as defined in claim 1 wherein said first layer is applied to said surface to be faced by being sprayed thereon.

14. The method as defined in claim 1 wherein said second layer is applied to the exposed surface of said first layer by being brushed thereon.

15. The method as defined in claim 1 wherein said second layer is applied to the exposed surface of said first layer by being rolled thereon.

16. The method as defined in claim 1 wherein said second layer is applied to the exposed surface of said first layer by being sprayed thereon.

17. The method as defined in claim 1 wherein said second layer is applied to the exposed surface of said first layer by being first poured thereon and then skimmed to the desired thickness.

18. The method as defined in claim 1 wherein between steps (d) and (e) a base layer of a primer material is applied to said exposed surface of said second layer prior to the application of the finishing layer thereover.

19. The method as defined in claim 18 wherein said primer material consists of a cellulose-based paint.

20. The method as defined in claim 18 wherein said primer material consists of an acrylic paint.

21. A surface facing having a coloured and textured exposed surface on which graffiti cannot be easily applied, and if successfully applied, from which it can be readily obliterated, said surface facing being formed by (a) applying to the surface to be faced a first layer of a priming and sealing coating composition which contains an aggregate material and a bonding agent, said first layer adhering to the surface to be faced and providing an exposed adhesive surface to which a second layer of coating material will readily adhere, (b) applying to the exposed surface of said first layer a second layer of a further coating composition which contains an aqueous mixture of a plaster material, a binding agent, a filler for hardening the further coating composition and a water-soluble colouring dye, said second layer providing an exposed surface which, prior to hardening, can be textured, (c) texturing the exposed surface of said second layer so as to provide a relief thereon, (d) allowing said second layer to harden such that the textured, exposed surface thereon will become resistant to indentation and cutting, and (e) applying over the textured, exposed surface of said hardened second layer a finishing layer of a cellulose-based coating, said finishing layer containing colouring matter and having a colour which is substantially the same as the colour of said further coating composition.

* * * * *